United States Patent Office 2,970,029
Patented Jan. 31, 1961

2,970,029
MIXTURE OF WATER-INSOLUBLE DISAZO DYESTUFFS

Herbert Kracker, Hans Albert, and Hans Thaler, Offenbach (Main), Germany, assignors to Farbwerke Hoechst Aktiengesellschaft vormals Meister Lucius & Brüning, Frankfurt am Main, Germany, a corporation of Germany No Drawing. Filed Dec. 1, 1958, Ser. No. 777,178

Claims priority, application Germany Dec. 3, 1957

6 Claims. (Cl. 8—26)

The present invention relates to new azo-dyestuffs insoluble in water and to a process for preparing the same. More particularly it relates to a mixture of azo-dyestuffs which correspond to the following general formulae

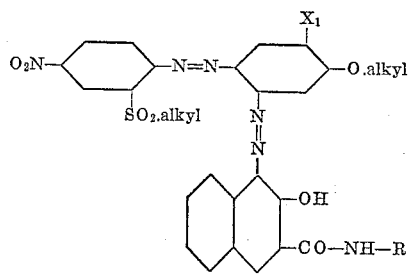

and

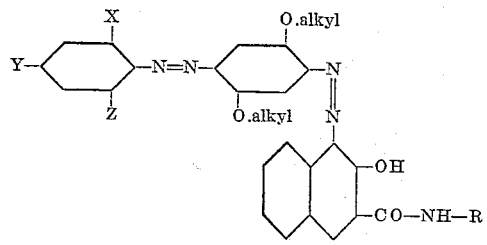

wherein X represents an alkylsulfonyl group or a halogen atom, $X_1$ represents an alkyl or alkoxy group, Y represents a nitro group or a halogen atom, Z represents a hydrogen or a halogen atom, and R represents an aryl radical free from groups imparting solubility in water. We have found that valuable new azo-dyestuffs insoluble in water are obtained by coupling in substance, on the fiber or on another substratum the diazonium compound from an orthoaminoazo-compound of the general formula

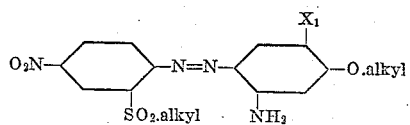

wherein $X_1$ represents an alkyl or alkoxy group, together with the diazonium compound from a para-aminoazo-compound of the following general formula

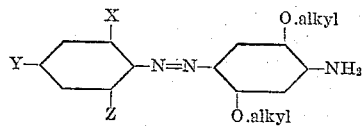

wherein X represents an alkylsulfonyl group or a halogen atom, Y represents a nitro group or a halogen atom and Z stands for a hydrogen or a halogen atom, with an arylamide of 2,3-hydroxynaphthoic acid which is free from groups imparting solubility in water.

The new dyestuffs yield on vegetable fibers including those of regenerated cellulose, according to known dyeing and printing methods black dyeings and prints which are distinguished by good properties of fastness, especially by a good fastness to light and washing.

The dyestuffs can also be prepared in substance or on a substratum and may be used for coloring high molecular plastic masses or for the preparation of color lakes.

The new dyestuffs can be prepared by the methods usual for this class of dyestuffs. The proportion of the diazonium compounds can be varied within certain limits. It is, therefore, not necessary to use equimolecular amounts of the diazonium compounds. However, it is advantageous, when the molar proportion of the diazonium compounds is within 3:2 to 2:3.

The following examples serve to illustrate the invention but they are not intended to limit it thereto.

Example 1

Cotton yarn is treated for 30 minutes in a goods-to-liquor ratio of 1:20 in the following impregnation bath, centrifuged and treated for 30 minutes at 15° C. in the developing bath in a goods-to-liquor ratio of 1:20. The yarn is rinsed cold with a solution containing, per liter of water, 3 cc. of hydrochloric acid of 20° Bé., soaped first for 15 minutes at 60° C. and then for 15 minutes at 95° C. with a solution containing, per liter of water, 1 gram of a reaction product from about 10 mols of ethylene oxide and 1 mol of isododecyl phenol, and also 1 gram of sodium carbonate, rinsed again and dried.

Impregnation bath:
  4 grams of 1-(2',3'-hydroxynaphthoylamino)-2,4-dimethoxy-5-chlorobenzene are dissolved in
  12 cc. of denatured alcohol,
  1.3 cc. of a sodium hydroxide solution of 32.5% strength,
  1.3 cc. of a formaldehyde solution of 33% strength, and
  4 cc. of water and the whole is made up to 1 liter with water of 35° C.,
  3 grams of a condensation product from high molecular fatty acids and protein degradation products, and
  10 cc. of sodium hydroxide solution of 32.5% strength.

Developing bath:
  0.45 gram of 4-amino-2,5-dimethoxy-2',4',6'-trichloro-1,1'-azo-benzene and
  0.5 gram of 2-amino-4-methoxy-5-methyl-2'-n-propylsulfonyl-4'-nitro-1,1'-azobenzene in the form of the diazonium compounds prepared in the usual manner are dissolved in 1 liter of water containing
  1 gram of a reaction product from about 20 mols of ethylene oxide and 1 mol of octodecyl alcohol, and
  5 cc. of acetic acid of 50% strength.

A deep black dyeing of very good properties of fastness is obtained.

The dyeing process can also be carried out on other fibers, for example on rayon or staple fibers of regenerated cellulose.

Example 2

Cotton fabric is padded on the foulard with the following solution and dried:

15 grams of 1-(2',3'-hydroxynaphthoylamino)-4-methoxybenzene are pasted with
15 grams of Monopol Brilliant Oil, and
24.5 cc. of sodium hydroxide solution of 32.5% strength, and made up to 1 liter with boiling water. The dried fabric is developed, by immersing and squeezing it two times, on a three-roller-foulard with a solution, containing per liter of water,
9.4 grams of 4-amino-2,5-dimethoxy-2'-methylsulfonyl-4'-nitro-1,1'-azobenzene and
10 grams of 2-amino-4,5-diethoxy-2'-methylsulfonyl-4'-nitro-1,1'-azobenzene in the form of the diazonium compounds prepared in the usual manner,
1 gram of a reaction product from about 20 mols of ethylene oxide and 1 mol of octodecyl alcohol, and
40 cc. of acetic acid of 50% strength.

After passage of air for 30–60 seconds the coupling is completed by a passage through water at 70–80°. The fabric is then rinsed and dried.

A full black dyeing of good properties of fastness is obtained.

For the production of a discharge the fabric is printed on the roller printing machine with a discharge printing paste of the following composition:

200 grams of sodium formaldehyde sulfoxylate of 90% strength,
150 grams of zinc oxide 1:1,
50 grams of the sodium salt of benzyl-sulfanilic acid 1:1,
20 grams of anthraquinone paste of 30% strength,
400 grams of starch-tragacanth thickening and
180 grams of water.

After printing and drying the fabric is steamed for 5–7 minutes in an air-free rapid ager and then rinsed cold. In order to remove the decomposition products adhering to the fiber, the fabric is after-treated with a hot solution containing, per liter of water, 5 grams of sodium carbonate, rinsed again and dried.

A clear white discharge on the black ground is obtained.

*Example 3*

Cotton fabric is padded on the foulard with the following solution and dried:

12 grams of 2,3-hydroxynaphthoylaminobenzene are pasted with
12 grams of Monopol Brilliant Oil and
18 cc. of sodium hydroxide solution of 32.5% strength and the whole is made up to 1 liter with boiling water.

The dried fabric is printed with a printing paste containing per kilogram 7.4 grams of 4-amino-2,5-dimethoxy-2',6'dichloro-4'-nitro-1,1'-azobenzene and
7.3 grams of 2-amino-4-methoxy-5-methyl-2'-methylsulfonyl-4'-nitro-1,1'-azobenzene in the form of the diazonium compounds prepared in the usual manner,
1 gram of a reaction product from about 20 mols of ethylene oxide and 1 mol of octodecyl alcohol,
20 cc. of acetic acid of 50% strength and tragacanth as thickening agent.

The printed fabric is then passed through a bath at 80° C. containing per liter of water 10 cc. of sodium bisulfite solution of 38% strength, and through several baths rendered alkaline with sodium carbonate in order to remove completely the impregnation. Finally, the fabric is soaped in the usual manner, rinsed and dried.

A full black print of very good properties of fastness is obtained.

*Example 4*

Cotton yarn on cross-wound bobbins is treated in a closed apparatus for 45 minutes at 35° C. in a goods-to-liquor ratio of 1:15 in the following impregnation bath, rinsed with a solution containing, per liter of water, 1 cc. of sodium hydroxide solution of 32.5% strength and 20 grams of sodium chloride, and the dyeing is developed for 45 minutes at 15° C. in the developing bath described below. The material is then soaped in the usual manner, rinsed and dried.

Impregnation bath:
  20.7 grams of 2-(2',3'-hydroxynaphthoylamino)-naphthalene are dissolved in
  25 cc. of denatured alcohol,
  8.3 cc. of sodium hydroxide solution of 32.5% strength,
  20.7 cc. of water and
  10.4 cc. of a formaldehyde solution of 33% strength, and the whole is made up to 9 liters with water of 35° C.,
  27 grams of a condensation product from high molecular fatty acids and protein degradation products, and
  90 cc. of sodium hydroxide solution of 32.5% strength.

Developing bath:
  7.5 grams of 4-amino-2,5-dimethoxy-2'-methylsulfonyl-4'-nitro-6'chloro-1,1'-azobenzene and
  7 grams of 2-amino-4,5-dimethoxy-2'-methylsulfonyl-4'-nitro-1,1'-azobenzene in the form of the diazonium compounds prepared in the usual manner are dissolved in 9 liters of water containing
  9 grams of a reaction product from about 20 mols of ethylene oxide and 1 mol of octodecyl alcohol, and
  45 cc. of acetic acid of 50% strength.

A deep black dyeing of very good properties of fastness is obtained.

*Example 5*

Cotton yarn is treated for 30 minutes in a goods-to-liquor ratio of 1:20 in the following impregnation bath, centrifuged and treated for 30 minutes at 15° C. in the developing bath in a goods-to-liquor ratio of 1:20. The yarn is then rinsed cold with a solution containing, per liter of water, 3 cc. of hydrochloric acid of 20° Bé., soaped first for 15 minutes at 60° C. and then for 15 minutes at 95° C. with a solution, containing per liter of water, 1 gram of a reaction product from about 10 mols of ethylene oxide and 1 mol of isododecyl phenol, and also 1 gram of sodium carbonate, rinsed again and dried.

Impregnation bath:
  1 gram of 1-(2',3'-hydroxynaphthoylamino)-4-chlorobenzene is dissolved in
  1 cc. of denatured alcohol,
  0.4 cc. of sodium hydroxide solution of 32.5% strength,
  1.5 cc. of water, and
  0.5 cc. of a formaldehyde solution of 33% strength, and the whole is made up to 1 liter with water of 35° C.,
  3 grams of a condensation product from high molecular fatty acids and protein degradation products, and
  5 cc. of sodium hydroxide solution of 32.5% strength.

Developing bath:
  0.6 gram of 4-amino-2,5-dimethoxy-2'-methylsulfonyl-4'-nitro-6'-chloro-1,1'-azobenzene and
  0.6 gram of 2-amino-4,5-diethoxy-2'-methylsulfonyl-4'-nitro-1,1'-azobenzene in the form of the diazonium compounds prepared in the usual manner are dissolved in 1 liter of water containing
  1 gram of a reaction product from about 20 mols of ethylene oxide and 1 mol of octodecyl alcohol, and
  3 cc. of acetic acid of 50% strength.

A grey dyeing of good properties of fastness is obtained.

Example 6

38 grams of 2-amino-4,5-dimethoxy-2'-methylsulfonyl-4'-nitro-1,1'-azobenzene and 41.5 grams of 4-amino-2,5-dimethoxy - 2' - methylsulfonyl - 4' - nitro - 6' - chloro-1,1'-azobenzene in the form of the diazonium chloride-zinc chloride double salts are dissolved in 8 liters of water. Into this diazo-solution is run, while stirring well, a solution of 65.5 grams of 1-(2',3'-hydroxynaphthoylamino)-2-methoxy-5-chlorobenzene in dilute sodium hydroxide solution. The coupling is completed by gradually heating to 90° C. The black dyestuff so obtained is filtered off, washed well and dried.

The coupling can also be carried out in the presence of a substratum adapted for the preparation of color lakes.

The following table indicates a number of further components which can be used in this invention, and also the tints of the azo-dyestuffs produced from these components on the fiber, which likewise possess good properties of fastness.

| Diazo Component I | Diazo Component II | Coupling Component | Tint |
| --- | --- | --- | --- |
| 4-amino-2,5-dimethoxy-2',6'-dichloro-4'-nitro-1,1'-azobenzene. | 2-amino-4,5-dimethoxy-2'-methylsulfonyl-4'-nitro-1,1'-azobenzene. | 1-(2',3'-hydroxy-naphthoylamino)-2-methoxy-4-chloro-5-methylbenzene. | bluish black. |
| 4-amino-2,5-dimethoxy-2'-methylsulfonyl-4'-nitro-1,1'-azobenzene. | ___do___ | 1-(2',3'-hydroxy-naphthoylamino)-2,5-dimethoxy-4-chlorobenzene. | Do. |
| 4-amino-2,5-dimethoxy-2',4',6'-trichloro-1,1'-azobenzene. | ___do___ | 1-(2',3'-hydroxy-naphthoylamino)-4-chlorobenzene. | reddish black. |
| 4-amino-2,5-dimethoxy-2'-n-propylsulfonyl-4'-nitro-1,1'-azobenzene. | ___do___ | 2-(2',3'-hydroxy-naphthoylamino)-naphthalene. | greenish black. |
| 4-amino-2,5-dimethoxy-2',6'-dichloro-4'-nitro-1,1'-azobenzene. | 2-amino-4-methoxy-5-methyl-2'-n-propylsulfonyl-4'-nitro-1,1'-azobenzene. | 2-(2',3'-hydroxy-naphthoylamino)-3-methoxydiphenylene oxide. | Do. |
| 4-amino-2,5-dimethoxy-2'-methylsulfonyl-4'-nitro-1,1'-azobenzene. | ___do___ | 1-(2',3'-hydroxy-naphthoylamino)-2-methoxybenzene. | black. |
| 4-amino-2,5-dimethoxy-2'-methylsulfonyl-4'-nitro-6'-chloro-1,1'-azobenzene. | ___do___ | 2,3-hydroxynaphthoylaminobenzene. | Do. |
| 4-amino-2,5-dimethoxy-2'-n-propylsulfonyl-4'-nitro-1,1'-azobenzene. | ___do___ | 1-(2',3'-hydroxy-naphthoylamino)-2-methyl-4-chlorobenzene. | greenish black. |
| 4-amino-2,5-dimethoxy-2',6'-dichloro-4'-nitro-1,1'-azobenzene. | 2-amino-4,5-diethoxy-2'-methylsulfonyl-4'-nitro-1,1'-azobenzene. | 1-(2',3'-hydroxy-naphthoylamino)-2,5-dimethoxy-4-chlorobenzene. | black. |
| 4-amino-2,5-dimethoxy-2',4',6'-trichloro-1,1'-azobenzene. | ___do___ | 1-(2',3'-hydroxy-naphthoylamino)-3-nitrobenzene. | reddish black. |
| 4-amino-2,5-dimethoxy-2'-n-propylsulfonyl-4'-nitro-1,1'-azobenzene. | ___do___ | 1-(2',3'-hydroxy-naphthoylamino)-4-ethoxybenzene. | bluish black. |
| Do. | ___do___ | 1-(2',3'-hydroxy-naphthoylamino)-2-methyl-4-chlorobenzene. | black. |
| 4-amino-2,5-dimethoxy-2'-methylsulfonyl-4'-nitro-1,1'-azobenzene. | 2-amino-4-methoxy-5-methyl-2'-methylsulfonyl-4'-nitro-1,1'-azobenzene. | 1-(2',3'-hydroxy-naphthoylamino)-4-ethoxybenzene. | greenish black. |
| 4-amino-2,5-dimethoxy-2'-methylsulfonyl-4'-nitro-6'-chloro-1,1'-azobenzene. | ___do___ | 1-(2',3'-hydroxy-naphthoylamino)-2,5-dimethoxybenzene. | Do. |
| 4-amino-2,5-dimethoxy-2',4',6'-trichloro-1,1'-azobenzene. | ___do___ | 1-(2',3'-hydroxy-naphthoylamino)-2,4-dimethoxy-5-chlorobenzene. | reddish black. |
| 4-amino-2,5-dimethoxy-2'-n-propylsulfonyl-4'-nitro-1,1'-azobenzene. | ___do___ | 1-(2',3'-hydroxy-naphthoylamino)-2-methyl-5-chlorobenzene. | greenish black. |
| Do. | ___do___ | 1-(2',3'-hydroxy-naphthoylamino)-2-methyl-4-chlorobenzene. | Do. |
| 4-amino-2,5-dimethoxy-4'-nitro-2',6'-dichloro-1,1'-azobenzene. | ___do___ | 1-(2',3'-hydroxy-naphthoylamino)-2-methyl-4-methoxybenzene. | black. |
| 4-amino-2,5-dimethoxy-2',6'-dichloro-4'-nitro-1,1'-azobenzene. | ___do___ | 2-(2',3'-hydroxy-naphthoylamino)-naphthalene. | Do. |
| Do. | 2-amino-4,5-dimethoxy-2'-methylsulfonyl-4'-nitro-1,1'-azobenzene. | 1-(2',3'-hydroxy-naphthoylamino)-2-methyl-4-methoxybenzene. | bluish black. |
| 4-amino-2,5-dimethoxy-2'-methylsulfonyl-4'-nitro-1,1'-azobenzene. | ___do___ | 2-(2',3'-hydroxy-naphthoylamino)-3-methoxydiphenylene oxide. | Do. |
| Do. | 2-amino-4-methoxy-5-methyl-2'-n-propylsulfonyl-4'-nitro-1,1'-azobenzene. | 1-(2',3'-hydroxy-naphthoylamino)-2-methoxy-4-chloro-5-methyl-benzene. | black. |
| Do. | 2-amino-4,5-diethoxy-2'-methylsulfonyl-4'-nitro-1,1'-azobenzene. | 1-(2',3'-hydroxy-naphthoylamino)-4-chlorobenzene. | Do. |
| Do. | 2-amino-4-methoxy-5-methyl-2'-methylsulfonyl-4'-nitro-1,1'-azobenzene. | 1-(2',3'-hydroxy-naphthoylamino)-2-ethoxybenzene. | Do. |
| 4-amino-2,5-dimethoxy-2'-methylsulfonyl-4'-nitro-6'-chloro-1,1'-azobenzene. | ___do___ | 1-(2',3'-hydroxy-naphthoylamino)-2-methylbenzene. | Do. |
| 4-amino-2,5-dimethoxy-2',4',6'-trichloro-1,1'-azobenzene. | ___do___ | 1-(2',3'-hydroxy-naphthoylamino)-2,3-dimethylbenzene. | reddish black. |
| 4-amino-2,5-dimethoxy-2',6'-dichloro-4'-nitro-1,1'-azobenzene. | 2-amino-4-methoxy-5-methyl-2'-n-propylsulfonyl-4'-nitro-1,1'-azobenzene. | 1-(2',3'-hydroxy-naphthoylamino)-4-ethoxybenzene. | Do. |
| 4-amino-2,5-dimethoxy-2'-methylsulfonyl-4'-nitro-6'-chloro-1,1'-azobenzene. | ___do___ | 1-(2',3'-hydroxy-naphthoylamino)-2-methyl-4-chlorobenzene. | black. |
| 4-amino-2,5-dimethoxy-2',4',6'-trichloro-1,1'-azobenzene. | ___do___ | 1-(2',3'-hydroxy-naphthoylamino)-naphthalene. | reddish black. |
| 4-amino-2,5-dimethoxy-2'-n-propylsulfonyl-4'-nitro-1,1'-azobenzene. | ___do___ | 1-(2',3'-hydroxy-naphthoylamino)-4-chlorobenzene. | greenish black. |
| 4-amino-2,5-dimethoxy-2',6'-dichloro-4'-nitro-1,1'-azobenzene. | 2-amino-4,5-diethoxy-2'-methylsulfonyl-4'-nitro-1,1'-azobenzene. | 1-(2',3'-hydroxy-naphthoylamino)-2-methoxybenzene. | bluish black. |
| 4-amino-2,5-dimethoxy-2'-methylsulfonyl-4'-nitro-6'-chloro-1,1'-azobenzene. | ___do___ | 1-(2',3'-hydroxy-naphthoylamino)-4-methoxybenzene. | Do. |
| 4-amino-2,5-dimethoxy-2',4',6'-trichloro-1,1'-azobenzene. | ___do___ | 2-(2',3'-hydroxy-naphthoylamino)-naphthalene. | reddish black. |
| Do. | 2-amino-4,5-dimethoxy-2'-methylsulfonyl-4'-nitro-1,1'-azobenzene. | 1-(2',3'-hydroxy-naphthoylamino)-2-methoxy-4-chloro-5-methyl-benzene. | black. |
| 4-amino-2,5-dimethoxy-2'-n-propylsulfonyl-4'-nitro-1,1'-azobenzene. | ___do___ | 1-(2',3'-hydroxy-naphthoylamino)-4-ethoxybenzene. | Do. |
| Do. | 2-amino-4-methoxy-5-methyl-2'-methylsulfonyl-4'-nitro-1,1'-azobenzene. | 1-(2',3'-hydroxy-naphthoylamino)-2-methyl-4-chlorobenzene. | greenish black. |

We claim:
1. Water-insoluble azo-dyestuffs consisting of a mixture of azo-dyestuffs which correspond to the following two formulae:

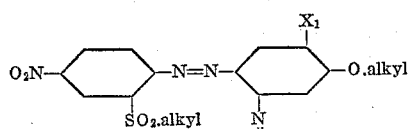

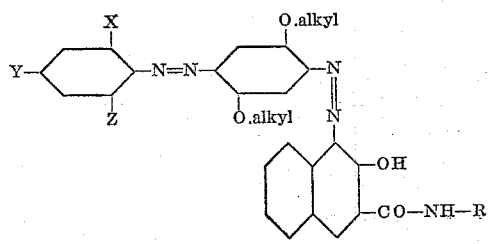

wherein X represents a member selected from the group consisting of alkylsulfonyl and chlorine, $X_1$ represents a member selected from the group consisting of lower alkyl and alkoxy, Y represents a member selected from the group consisting of nitro and chlorine, Z represents a member selected from the group consisting of hydrogen and chlorine, and R represents a member selected from the group consisting of radicals of the benzene, naphthalene and diphenylene oxide series, and wherein the alkyl groups contain 1 to 3 carbon atoms.

2. A water-insoluble azo-dyestuff consisting of a mixture of the following two azo-dyestuffs

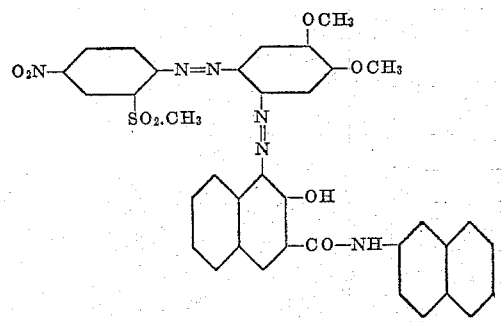

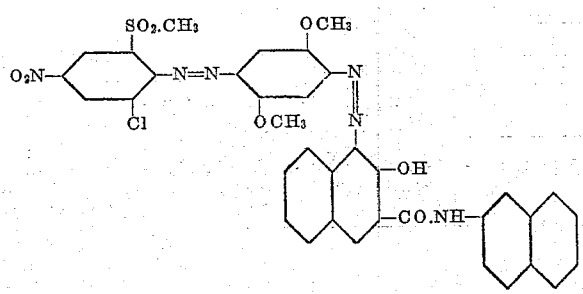

3. A water-insoluble azo-dyestuff consisting of a mixture of the following two azo-dyestuffs

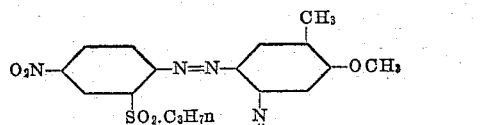
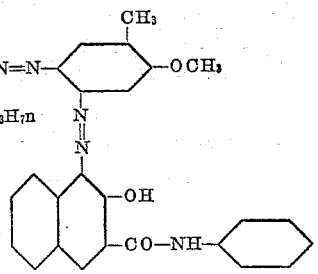

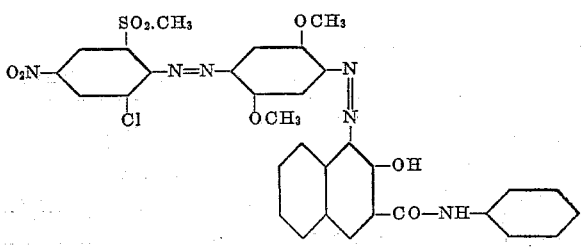

4. A water-insoluble azo-dyestuff consisting of a mixture of the following two azo-dyestuffs

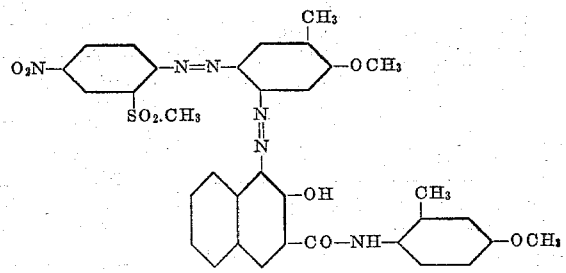
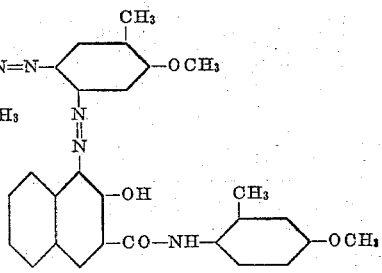

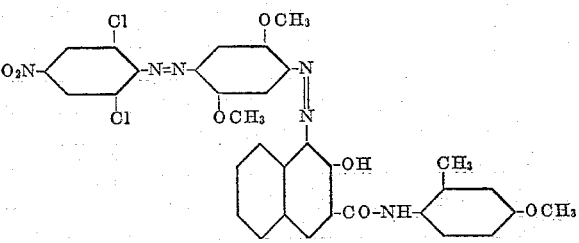

5. A water-insoluble azo-dyestuff consisting of a mixture of the following two azo-dyestuffs

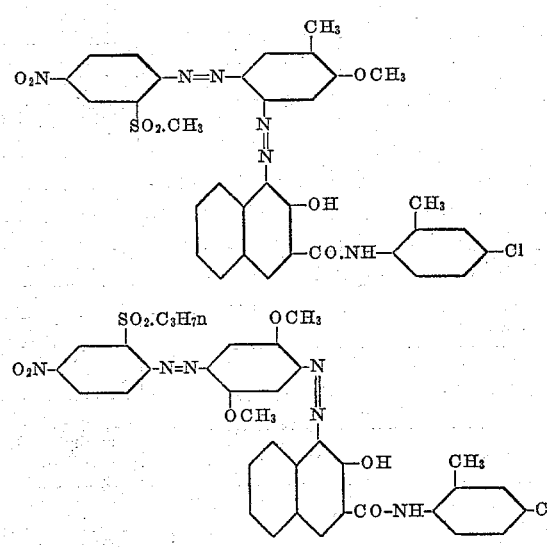
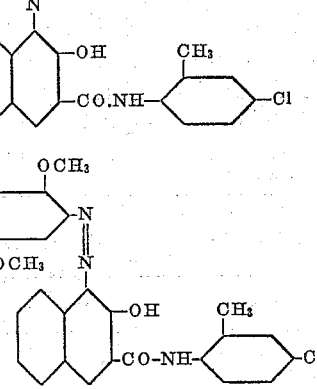

6. A water-insoluble azo-dyestuff consisting of a mixture of the following two azo-dyestuffs
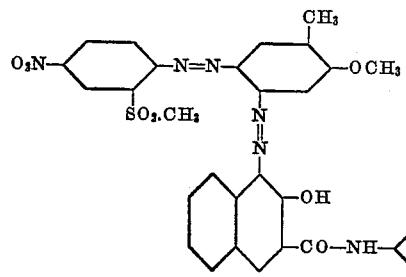
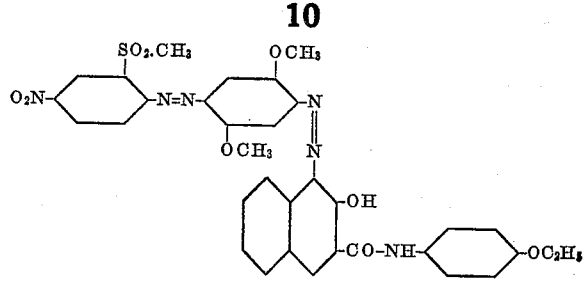
References Cited in the file of this patent
UNITED STATES PATENTS
| | | |
|---|---|---|
| 2,069,158 | Schnitzspahn et al. | Jan. 26, 1937 |
| 2,105,919 | Hoffa et al. | Jan. 18, 1938 |
| 2,163,073 | Thoma et al. | June 20, 1939 |
| 2,171,824 | Bonhote et al. | Sept. 5, 1939 |
| 2,312,398 | Felix | Mar. 2, 1943 |